(12) United States Patent
Kawamura et al.

(10) Patent No.: US 6,198,877 B1
(45) Date of Patent: *Mar. 6, 2001

(54) METHOD AND APPARATUS FOR RECORDING PROGRAMS FORMED OF PICTURE AND AUDIO DATA, DATA RECORDING MEDIUM HAVING PROGRAMS FORMED OF PICTURE AND AUDIO DATA RECORDED THEREON, AND METHOD AND APPARATUS FOR REPRODUCING PROGRAMS HAVING PICTURE AND AUDIO DATA

(75) Inventors: Makoto Kawamura; Yasushi Fujinami, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/691,112

(22) Filed: Aug. 1, 1996

(30) Foreign Application Priority Data

Aug. 4, 1995 (JP) .................................................... 7-200120

(51) Int. Cl.[7] .................................................. H04N 5/781
(52) U.S. Cl. ............................. 386/98; 386/125; 386/126
(58) Field of Search ................................. 386/33, 45, 46, 386/70, 95, 82, 109, 111–112, 125–126, 98, 101, 104–106; 348/423; H04N 5/92, 5/93, 5/781

(56) References Cited

U.S. PATENT DOCUMENTS

| 5,455,684 | * | 10/1995 | Fujinami et al. | 386/112 |
| 5,502,573 | * | 3/1996 | Fujinami | 386/95 |
| 5,504,585 | * | 4/1996 | Fujinami et al. | 386/111 |
| 5,592,450 | * | 1/1997 | Yonemitsu et al. | 386/126 |
| 5,602,956 | * | 2/1997 | Suzuki et al. | 386/111 |
| 5,621,840 | * | 4/1997 | Kawamura et al. | 386/95 |

FOREIGN PATENT DOCUMENTS

| 0 570 922 | 11/1993 | (EP) . |
| 0 644 692 | 3/1995 | (EP) . |
| 0 655 740 | 5/1995 | (EP) . |
| 0 673 034 | 9/1995 | (EP) . |
| 0 686 973 | 12/1995 | (EP) . |
| WO 94 07332 | 3/1994 | (WO) . |

* cited by examiner

Primary Examiner—Thai Tran
(74) Attorney, Agent, or Firm—Frommer Lawrence & Haug, LLP.; William S. Frommer; Dennis M. Smid

(57) ABSTRACT

A data recording technique in which a file for a computer system is arranged on a recording medium between the TOC and video or audio data, thereby enabling the video or audio data to be readout at a high speed and reproduced either by the computer system or by a relatively inexpensive reproducing apparatus (e.g. CD or video CD player). Digital moving picture data and audio data are formed into packets and recorded as time division multiplexed bit streams, the bit streams being split in a self-complete manner, and with the split bit stream representing one program being recorded in a respective one of plural areas. Start access entry points of the programs also are recorded to establish self-complete positions of those programs.

22 Claims, 16 Drawing Sheets

| BP | Field name | Content |
|---|---|---|
| 1 | Volume Descriptor Type | numerical value |
| 2 to 6 | Standard Identifier | CD001 |
| 7 | Volume Descriptor Version | numerical value |
| 8 | Unused Field | (00) byte |
| 9 to 40 | System Identifier | a-characters |
| 41 to 72 | Volume Identifier | d-characters |
| 73 to 80 | Unused Field | (00) bytes |
| 81 to 88 | Volume Space Size | numerical value |
| 89 to 120 | Unused Field | (00) bytes |
| 121 to 124 | Volume Set Size | numerical value |
| 125 to 128 | Volume Sequence Number | numerical value |
| 129 to 132 | Logical Block Size | numerical value |
| 133 to 140 | Path Table Size | numerical value |
| 141 to 144 | Location of Occurrence of Type L Path Table | numerical value |
| 145 to 148 | Location of Optional Occurrence of Type L Path Table | numerical value |
| 149 to 152 | Location of Occurrence of Type M Path Table | numerical value |
| 153 to 156 | Location of Optional Occurrence of Type M Path Table | numerical value |
| 157 to 190 | Directory Record for Root Directory | 34 bytes |
| 191 to 318 | Volume Set Identifier | d-characters |
| 319 to 446 | Publisher Identifier | a-characters |
| 447 to 574 | Data Preparer Identifier | a-characters |
| 575 to 702 | Application Identifier | a-characters |
| 703 to 739 | Copyright File Identifier | d-characters, SEPARATOR 1, SEPARATOR 2 |
| 740 to 776 | Abstract File Identifier | d-characters, SEPARATOR 1, SEPARATOR 2 |
| 777 to 813 | Bibliographic File Identifier | d-characters, SEPARATOR 1, SEPARATOR 2 |
| 814 to 830 | Volume Creation Date and Time | Digit(s), numerical value |
| 831 to 847 | Volume Modification Date and Time | Digit(s), numerical value |
| 848 to 864 | Volume Expiration Date and Time | Digit(s), numerical value |
| 865 to 881 | Volume Effective Date and Time | Digit(s), numerical value |
| 882 | File Structure Version | numerical value |
| 883 | (Reserved for future standardization) | (00) byte |
| 884 to 1 395 | Application Use | not specified |
| 1 396 to 2 048 | (Reserved for future standardization) | (00) bytes |

FIG.2

| Syntax | No. of bits | Mnemonic |
|---|---|---|
| disc_toc (){ | | |
|     dvd_signature | 64 | bslbf |
|     dvd_version | 32 | bslbf |
|     length | 16 | uimsbf |
|     toc_type | 8 | bslbf |
|     reserved | 8 | bslbf |
|     album() | | |
|     catalogue() | | |
|     reserved | 16 | uimsbf |
|     number_of_programs (NOP) | 16 | bslbf |
|     program_linkage_offset | 32 | uimsbf |
|     disc_track_offset | 32 | uimsbf |
|     program_toc_pointers_offset | 32 | uimsbf |
|     disc_play_time_offset | 32 | uimsbf |
|     disc_name_offset | 32 | uimsbf |
|     disc_date_offset | 32 | uimsbf |
|     disc_copyright_offset | 32 | uimsbf |
|     disc_publisher_offset | 32 | uimsbf |
|     reserved | 288 | bslbf |
|     program_linkage() | | |
|     disc_tracks() | | |
|     program_toc_pointers() | | |
|     disc_play_time() | | |
|     disc_name() | | |
|     disc_date() | | |
|     disc_copyright() | | |
|     disc_publisher() | | |
| } | | |

FIG.3

| Syntax | No. of bits | Mnemonic |
|---|---|---|
| album(){ | | |
|     id_string | 128 | bslbf |
|     discs_in_album | 16 | uimsbf |
|     disc_number | 16 | uimsbf |
| } | | |

FIG.4

| Syntax | No. of bits | Mnemonic |
|---|---|---|
| catalogue(){ | | |
|     catalogue_string() | 128 | bslbf |
| } | | |

FIG.5

| Syntax | No. of bits | Mnemonic |
|---|---|---|
| program_linkage(){ | | |
|     for(p=0;p<NOP;p++){ | | |
|         first_track_number | 32 | uimsbf |
|         last_track_number | 32 | uimsbf |
|         first_track_lsa | 32 | uimsbf |
|         last_track_lsa | 32 | uimsbf |
|         last_es_lsa | 32 | uimsbf |
|         last_program_lsa | 32 | uimsbf |
|         program_start_tc | | |
|     } | | |
| } | | |

FIG.6

| Syntax | No. of bits | Mnemonic |
|---|---|---|
| disc_tracks(){ | | |
|     for(i=0;i<8;i++){ | | |
|         number_of_tracks(NOT) | 16 | uimsbf |
|         reserved | 16 | bslbf |
|         for(t=0;t<NOT;T++){ | | |
|             program_number | 16 | uimsbf |
|             track_number | 16 | uimsbf |
|             start_lsa | 32 | uimsbf |
|             last_lsa | 32 | uimsbf |
|             last_es_lsa | 32 | uimsbf |
|             track_playing_time() | | |
|         } | | |
|     } | | |
| } | | |

FIG.7

| Syntax | No. of bits | Mnemonic |
|---|---|---|
| time(){ | | |
|     tc_hours_1 | 4 | bcd |
|     tc_hours_2 | 4 | bcd |
|     tc_minutes_1 | 4 | bcd |
|     tc_minutes_2 | 4 | bcd |
|     tc_seconds_1 | 4 | bcd |
|     tc_seconds_2 | 4 | bcd |
|     reserved | 8 | bslbf |
| } | | |

FIG.8

| Syntax | No. of bits | Mnemonic |
|---|---|---|
| program_toc_pointer(){     for(p=0;p<NOP;p++){         program_toc_lsa     } } | 32 | uimsbf |

FIG.9

| Syntax | No. of bits | Mnemonic |
|---|---|---|
| disc_play_times(){     for(i=0;i<8;i++){         disc_playing_time()     } } | | |

FIG.10

| Syntax | No. of bits | Mnemonic |
|---|---|---|
| disc_name(){ | | |
|     number_of_languages(NOL) | 16 | uimsbf |
|     original_language_number | 16 | bslbf |
|     for(l=0;l<NOL;l++){ | | |
|         language_code | 24 | bslbf |
|         character_set_code | 8 | bslbf |
|         disc_name_string_offset | 32 | uimsbf |
|     } | | |
|     for(n=0;n<NOL;n++){ | | |
|         disc_name_string() | | |
|     } | | |
|     stuffing_byte | 0-24 | bslbf |
| } | | |

FIG.11

| Value | Character set |
|---|---|
| 0 | reserved |
| 1 | ISO 646 |
| 2-255 | reserved(TBD) |

FIG.12

| Syntax | No. of bits | Mnemonic |
|---|---|---|
| disc_date(){ | | |
|     disc_recording_date() | | |
| } | | |

FIG.13

| Syntax | No. of bits | Mnemonic |
|---|---|---|
| date(){ | | |
|     year | 16 | bcd |
|     month | 8 | bcd |
|     day | 8 | bcd |
|     time() | | |
| } | | |

FIG.14

| Syntax | No. of Bits | Mnemonic |
|---|---|---|
| program_toc(){ | | |
|     dvd_signature | 64 | bslbf |
|     dvd_version | 32 | bslbf |
|     length | 16 | uimsbf |
|     toc_type | 8 | bslbf |
|     reserved | 8 | bslbf |
|     number_of_tracks (NOT) | 16 | uimsbf |
|     reserved | 16 | bslbf |
|     program_start_lsa | 32 | uimsbf |
|     path_rating_assignment_offset | 32 | uimsbf |
|     for (i=0; i<8; i++){ | | |
|         program_tracks_offset_i | 32 | uimsbf |
|     } | | |
|     elementary_stream_info_offset | 32 | uimsbf |
|     program_play_times_offset | 32 | uimsbf |
|     program_name_offset | 32 | uimsbf |
|     track_names_offset | 32 | uimsbf |
|     program_date_offset | 32 | uimsbf |
|     track_dates_offset | 32 | uimsbf |
|     program_copyright_offset | 32 | uimsbf |
|     program_publisher_offset | 32 | uimsbf |
|     reserved | 288 | bslbf |
|     path_rating_assignments() | | |
|     for (i=0; i<8; i++){ | | |
|         if (program_chapters_offset_i>0){ | | |
|             program_tracks() | | |
|             entry_points() | | |
|             path_table() | | |
|         } | | |
|     } | | |
|     elementary_stream_info() | | |
|     program_play_times() | | |
|     program_name() | | |
|     track_names() | | |
|     program_date() | | |
|     track_dates() | | |
|     program_copyright() | | |
|     program_publisher() | | |

FIG.15

| Syntax | No. of bits | Mnemonic |
|---|---|---|
| program_tracks(){ | | |
|     number_of_path_tracks(NOPT) | 16 | uimsbf |
|     reserved | 16 | bslbf |
|     for(t=0;t<NOPT;t++){ | | |
|         reserved | 16 | bslbf |
|         track_number | 16 | uimsbf |
|         start_rsa | 32 | uimsbf |
|         last_rsa | 32 | uimsbf |
|         last_es_rsa | 32 | uimsbf |
|         track_playing_time() | 32 | uimsbf |
|     } | | |
| } | | |

FIG.16

| Syntax | No. of bits | Mnemonic |
|---|---|---|
| program_play_times(){ | | |
|     for(i=0;i<8;i++){ | | |
|         program_playing_time() | | |
|     } | | |
| } | | |

FIG.17

| Syntax | No. of bits | Mnemonic |
|---|---|---|
| program_name(){ | | |
|     number_of_languages(NOL) | 16 | uimsbf |
|     original_language_number | 16 | bslbf |
|     for(l=0;l<NOL;l++){ | | |
|         language_code | 24 | bslbf |
|         character_set_code | 8 | bslbf |
|         program_name_string_offset | 32 | uimsbf |
|     } | | |
|     for(n=0;n<NOL;n++){ | | |
|         program_name_string() | | |
|     } | | |
|     stuffing_bytes | 0-24 | bslbf |
| } | | |

FIG.18

| Syntax | No. of bits | Mnemonic |
|---|---|---|
| track_names(){ | | |
|     number_of_languages(NOL) | 16 | uimsbf |
|     original_language_number | 16 | bslbf |
|     for(l=0;l<NOL;l++){ | | |
|         language_code | 24 | bslbf |
|         character_set_code | 8 | bslbf |
|         for(t=0;t<NOT;t++){ | | |
|             track_name_string_offset | 32 | uimsbf |
|         } | | |
|     } | | |
|     for(n=0;n<NOL*NOT;n++){ | | |
|         track_name_string() | | |
|     } | | |
|     stuffing_bytes | 0-24 | bslbf |
| } | | |

FIG.19

| Syntax | No. of bits | Mnemonic |
|---|---|---|
| program_dates(){ | | |
|     program_recording_date() | | |
| } | | |

FIG.20

| Syntax | No. of bits | Mnemonic |
|---|---|---|
| track_dates(){ | | |
|     for(t=0;t<NOT;t++){ | | |
|         track_recording_date() | | |
|     } | | |
| } | | |

FIG.21

FIG.22
| FIG. 22A | FIG. 22B | FIG. 22C |
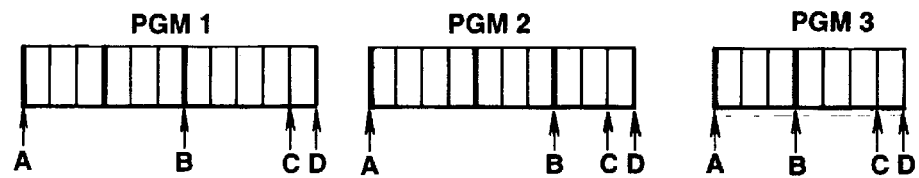
FIG. 22A     FIG. 22B     FIG. 22C
FIG.23
| FIG. 23A | FIG. 23B |
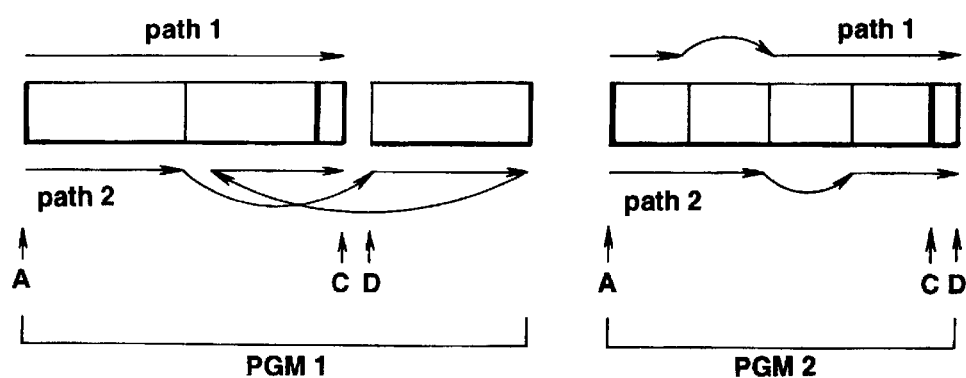
FIG. 23A     FIG. 23B

METHOD AND APPARATUS FOR RECORDING PROGRAMS FORMED OF PICTURE AND AUDIO DATA, DATA RECORDING MEDIUM HAVING PROGRAMS FORMED OF PICTURE AND AUDIO DATA RECORDED THEREON, AND METHOD AND APPARATUS FOR REPRODUCING PROGRAMS HAVING PICTURE AND AUDIO DATA

BACKGROUND OF THE INVENTION

This invention relates to a technique for recording and reproducing compressed, time division multiplexed video and audio data on, for example, optical disc.

Disc-shaped recording media have come into widespread use for recording speech, video information and computer data. For example, the CD-ROM is used to record speech data, video data and other computer-usable data for use in a computer system. Files that are used for accessing the recording medium exhibit an advanced file classification storage function, such as the tree structure shown in FIG. 27 for re-writing or erasing part of the stored data. A directory record which identifies the file position is placed at an arbitrary position on the recording medium, as shown in FIG. 28 and as a result, a file may be recorded in a split form.

In a CD or in a video CD, a table-of-contents (TOC) area is provided at the leading end, or beginning portion, of the recording medium, and file position information is collectively recorded therein. Since audio data and video data are recorded continuously, normal and special reproduction (e.g., reverse play, fast play, etc.) likewise may be continuous. Such CDs and video CDs do not require a computer to recover data thereon, and thus, a dedicated reproducing apparatus, less expensive than a computer has been put to practical utilization. Nevertheless, as the processing ability of computers advances and as the cost of computing decreases, thereby making it feasible for a computer to handle audio data and video data, the usefulness of reproducing data recorded on a digital recording medium, such as a CD or a video CD, has been increasing.

However, when conventional computer techniques are used to reproduce data from a digital recording medium, such as a CD or a video CD, a dedicated program or file system must be recorded for the computer to recognize in order to reproduce the CD or the video CD, and a separate file needed for the file system, or a special computer program, must be disposed outside the area in which the continuous audio and picture data are recorded. As a result, the optical pickup for the recording medium is moved frequently to the separate computer program or file system, thus generally lowering the access speed of the optical disc drive.

Conversely, with a dedicated reproducing apparatus (i.e., not a computer or PC) for a medium in which data is recorded continuously, such as a CD player or a video CD player, it is difficult to operate with a recording medium on which the data has been recorded in a computer-compatible file system and thus possibly has been recorded discontinuously.

OBJECTS OF THE INVENTION

It is, therefore, an object of the present invention to provide a technique which arrays the file on a recording medium that can be used with a computer system, the file being located between the TOC and the picture and audio data, thereby permitting high speed data readout from the computer system while facilitating continuous data readout using an inexpensive reproducing apparatus.

It is another object of the present invention to provide a technique in which part of the program data is self-complete and may be re-utilized.

It is yet another object of the present invention to provide a technique in which program-based addition, deletion and editing of plural programs may be made easily.

It is still another object of the present invention to provide a data recording technique and a recording medium in which plural programs may be manipulated easily and speedily even with an inexpensive reproducing apparatus.

SUMMARY OF THE INVENTION

In one aspect, the present invention provides a data recording technique wherein digital moving picture data and audio data in a bit stream are divided into packets, and a plurality of accessing start entry points are established for the time-division multiplexing of the bit stream. The resulting bit stream is split in a self-complete manner and digital moving pictures and speech data of a given program are recorded in each of plural areas of a recording medium.

The present invention provides a data recording medium on which is recorded the aforementioned multiplexed packets of digital moving picture data and audio data. As another aspect, the present invention provides a technique for reproducing the multiplexed packets of digital moving picture data and audio data as one program from each area of the data recording medium.

According to this invention, a file for a computer system is arranged between the TOC and video or audio data so that readout from the computer system may be made at a high speed and yet reproduction of the video or audio data may be readily attained by an inexpensive reproducing apparatus.

By designing part of the data in the program in self-complete form, re-utilization of various portions becomes feasible. In addition, program-based addition, deletion or editing of plural programs may be carried out easily. Plural programs may be handled easily and speedily even with inexpensive reproducing apparatus.

BRIEF DESCRIPTION OF THE DRAWINGS

FIG. 2 shows the contents of basic descriptors recorded in a basic descriptor recording area of the data recording medium.

FIG. 3 shows the contents of the disc TOC information recorded in the disc TOC area of the data recording medium.

FIG. 4 shows the contents of album information recorded in the disc TOC area of the data recording medium.

FIG. 5 shows the contents of catalog information recorded in the disc TOC area of the data recording medium.

FIG. 6 shows the contents of program linkage information recorded in the disc TOC area of the data recording medium.

FIG. 7 shows the contents of disc track linkage information recorded in the disc TOC area of the data recording medium.

FIG. 8 shows the contents of time information recorded in the disc TOC area of the data recording medium.

FIG. 9 shows the contents of a program TOC pointer recorded in the disc TOC area of the data recording medium.

FIG. 10 shows the contents of the overall disc reproducing time recorded in the disc TOC area of the data recording medium.

FIG. 11 shows the contents of disc name information recorded in the disc TOC area of the data recording medium.

FIG. 12 shows the contents of character set field information recorded in the disc TOC area of the data recording medium.

FIG. 13 shows the contents of disc data information recorded in the disc TOC area of the data recorded medium.

FIG. 14 shows the contents of date information recorded in the disc TOC area of the data recording medium.

FIG. 15 shows the contents of program TOC information recorded in the disc TOC area of the data recording medium.

FIG. 16 shows the contents of program track information recorded in the program TOC information.

FIG. 17 shows the contents of the overall program reproducing time information recorded in the program TOC information.

FIG. 18 shows the contents of disc program name information recorded in the program TOC information.

FIG. 19 shows the contents of track name information recorded in the program TOC information.

FIG. 20 shows the contents of program data information recorded in the program TOC information.

FIG. 21 shows the contents of track data information recorded in the program TOC information.

FIG. 22 schematically shows the contents of plural programs recorded according to the present invention.

FIG. 23 schematically shows other contents of plural programs recorded according to the present invention.

DESCRIPTION OF THE PREFERRED EMBODIMENTS

Figure 1:
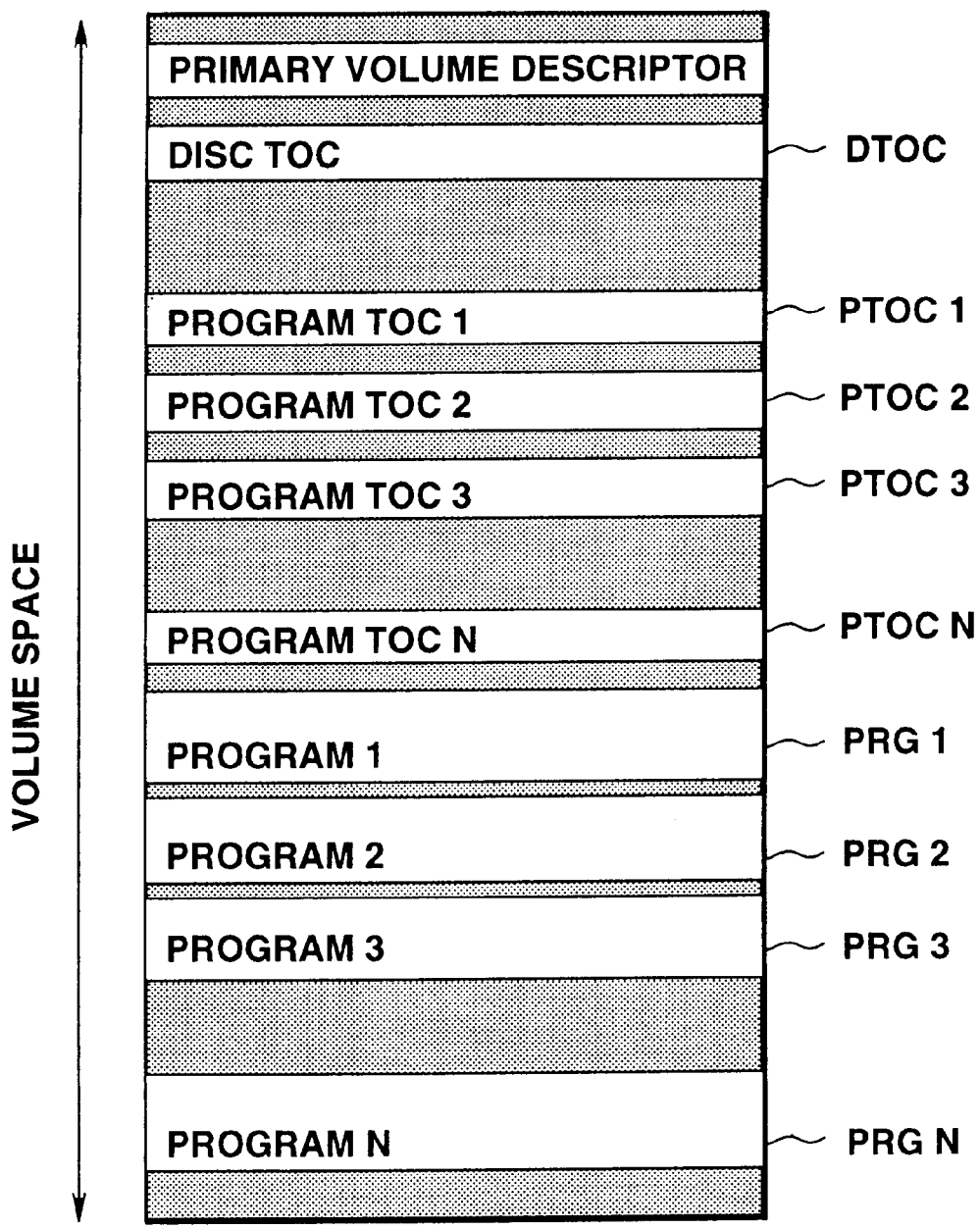
FIG. 1 schematically shows the data structure of a recording medium according to the present invention.

Referring to the drawings, preferred embodiments of the present invention will be explained in detail.

A data recording medium according to the present invention is provided with a basic descriptor recording area PVD, a disc table of contents recording area DTOC, a plurality of program table of contents information recording areas PTOC1, PTOC2, PTOC3, . . . PTOCN and a plurality of program information recording areas PRG1, PRG2, PRG3, . . . PRGN, as shown in FIG. 1.

In the basic descriptor recording area PVD (identified in FIG. 1 as the primary volume descriptor) are recorded the contents of a basic descriptor (Disc Volume Descriptor) consistent with the ISO9660 standard as shown in FIG. 2.

In the disc TOC recording area DTOC, the disc table of contents information (Disc TOC) is defined, representing the recording contents of the data recording medium. The syntax Disc TOC() is as shown in FIG. 3.

The disc TOC information (Disc TOC), recorded in the disc TOC information area DTOC, includes "dvd_signature" which defines a digital video disc and is an 8-byte string as prescribed in the ISO646 standard. The "dvd_version" identifies the digital video disc version and is a 4-byte string as prescribed in ISO646. "Length" specifies the total number of sectors in the disc TOC recording area DTOC, "toc_type" defines the TOC type and has the value of "1" to represent DTOC (as opposed, for example, to PTOC). "Album ()" is a table which indicates that this disc is one of a set of discs and has the syntax shown in FIG. 4. "Catalogue ()" is a string of bits which specifies the product number that identifies the disc as a catalog disc, "number of programs (NOP)" specifies the total number of programs on the disc, "program_linkage_offset" is an offset specifying the number of bytes from the DTOC start position to the start position of the "program_linkage" section, "disc_track_offset" is an offset specifying the number of bytes from the DTOC start position to the start position of the "disc_tracks" section, "program_toc_pointers offset" is an offset specifying the number of bytes from the DTOC start position to the start position of the "program_toc_pointers" section, "disc_play_time_offset" is an offset specifying the number of bytes from the DTOC start position to the start position of the "disc_play_time" section, "disc_name_offset" is an offset specifying the number of bytes from the DTOC start position to the start position of the "disc_name" section, "disc_date_offset" is an offset specifying the number of bytes from the DTOC start position to the start position of the "disc_date" section, "disc_copyright_offset" is an offset specifying the number of bytes from the DTOC start position to the start position of the "disc_copyright" section, and "disc_publisher_offset" is an offset specifying the number of bytes from the DTOC start position to the start position of the "disc_publisher" section.

"Album ()" in the disc TOC information (Disc_toc ()) has the syntax shown in FIG. 4 in which "id_string" defines an album and is a 16-byte string as prescribed in ISO646, "discs_in_album" specifies the total number of discs of the album and "disc_number" is the number of this particular disc in the album.

"Catalogue ()" in the disc TOC information has the syntax shown in FIG. 5 wherein "catalogue_string" is a 16-byte string as prescribed in ISO646 defining its disc.

"Program linkage ()" recorded in the disc TOC recording area contains linkage information between programs and has the syntax shown in FIG. 6. Here, "first_track_number" specifies the absolute track number of the leading track of the P'th program, "last_track_number" specifies the absolute track number of the last track of the P'th program, "first_track_lsa" specifies the logical sector address of the start position of the first track of the P'th program, "last_track_lsa" specifies the logical sector address of the beginning of the last track of the P'th program, "last_es_lsa" specifies the logical sector address of the last entry sector of the last track of the Path program, "last_program_las" specifies the logical sector address of the end position of the last track of the P'th program, and "program_start_tc" is the start time code of the P'th program.

The absolute track number is a track number unique to the track on the recording medium and corresponds to the serial track number for all programs, that is, from the beginning of the disc to the end. On the other hand, the relative track number begins with 1 in each program and is a track number unique only to that program.

In the present embodiment, the contents of "program_linkage ()" is not changed from path to path. However, in an alternative embodiment, the contents of "program linkage ( )" may change from path to path, in which case it suffices if the number specified by "program_linkage ( )" and the number specified by "program_linkage_offset" are set so as to be equal to the number of paths. As used herein, "path" means one of plural reproducing sequences of plural program portions.

"Disc_tracks ( )" recorded in the disc TOC recording area represents the information on each track for the programs in each of the tracks or paths on the disc, and has the syntax shown in FIG. 7. The "number_of_tracks" denotes the total number of tracks on the disc that are used in this path, "program_number" is the number of the program which contains this track, "track_number" is an absolute track number of the track, "start_lsa" is the logical sector address of the start sector of the track, "last_lsa" is the logical sector address of the last sector of the track, "last_es_lsa" is the logical sector address of the last entry sector of the track and "track_playing_time" is the normal playing time of the track.

Preferably, time information recorded in the disc TOC information area exhibits the syntax of FIG. 8, wherein hours, minutes and seconds are represented as:
Hours="tc_hours_1" and 10+"tc_hours_2"
Minutes="tc_minutes_1" and 10+"tc_minutes_2"
Seconds="tc_seconds_1" and 10+"tc_seconds_2"

"Program_toc pointers ( )" is recorded in the disc TOC recording area DTOC to identify the leading logical sector address of each program TOC information recording area PTOC and exhibits the syntax of FIG. 9. "Program_toc_lsa" is the logical sector address of the leading sector of each program TOC information recording area PTOC.

"Disc_play_times ( )" recorded in the disc TOC information area DTOC represents the overall playing time for the entry disc and has the syntax of FIG. 10 "Disc_playing_time ( )" is the total disc play time required in the path.

"Disc_name ( )" recorded in the disc TOC recording area DTOC, represents the name of the disc and has the syntax of FIG. 11. "Number_of_languages" denotes the number of languages in which the disc name is represented, "original_language_number" is the language number of the original language in which the disc is recorded, "language_code" is a three-letter character as prescribed in the ISO639-2 standard and "character_set_code" is an identification number of the character set used to represent the disc name. The "character_set_code" is shown in FIG. 12.

"Disc_name_string_offset" in FIG. 11 specifies the number of bytes from the start position of "disc_name" to the first character of "disc_name_string ( )", and "disc_name_string" is the data which actually specifies the disc name.

"Disc_date ( )" recorded in the disc TOC recording area DTOC specifies the date on which the disc was recorded and has the syntax of FIG. 13. "Disc_recording_date ( )" identifies the recording date of the disc by "date ( )" having the syntax shown in FIG. 14.

"Disc_copyright ( )" and "disc_publisher ( )" are recorded in the DTOC area to provide copyright information and publisher information of the disc, and may be freely set as desired by the copyright owner and by the publisher for the particular recording contents on the disc.

In the program TOC information recording areas PTOC1, PTOC2, PTOC3, . . . PTOCN on the recording medium shown in FIG. 1, the program TOC information (Program TOC 1, Program TOC 2, Program TOC 3, . . . Program TOC N) specifies the content of the respective program information recording areas PRG1, PRG2, PRG3, . . . PRGN and is recorded in each respective program TOC area as "Program_toc ( )" with the syntax shown in FIG. 15.

In the syntax of FIG. 15, "dvd_signature" defines a digital video disc and is an 8-byte string as prescribed in the ISO646 standard. "Dvd_version" specifies the version of the digital video disc and is a 4-byte string as prescribed in ISO646. "Length" specifies the total number of sectors in the program TOC information recording area PTOC, "toc_type" defines the TOC type and for the program type TOC (i.e., PTOC) has a value of "2". "Number_of_tracks" represents the total number of tracks of the program, "program_start_lsa" identifies the logical sector address of the program start position, "program_tracks_offset" is an offset specifying the number of bytes from the start position of "Program_toc ( )" up to "program_tracks ( )" of a path i. "Elementary stream_info_offset" is an offset specifying the number of bytes from the start position of "Program_toc ( )" up to "elementary_stream info ( )", "program_play_times_offset" is an offset specifying the number of bytes from the start position of "Program_toc( )" up to "program_play_times ( )", "program_name_offset" is an offset specifying the number of bytes from the start position of "Program_toc ( )" up to "program_name ( )", "track_names_offset" is an offset specifying the number of bytes from the start position of "Program toc ( )" up to "track_names ( )", "track_dates_offset" is an offset specifying the number of bytes from the start position of "Program toc ( )" up to "track_dates ( )", "program copyright_offset" is an offset specifying the number of bytes from the start position of "Program_toc ( )" up to "program_copyright ( )," and "program_publisher_offset" is an offset specifying the number of bytes from the start position of "Program_toc ( )" up to "program_publisher ( )".

The program TOC information includes a "program purpose" area shown in FIG. 15 as "for (i=0; i<8; i++)" and this program purpose area includes areas in which a variety of information data are defined, as shown by the syntax of FIG. 16. Here, "number_of_path_tracks" denotes the total number of tracks employed in the path i, "start_rsa" is a relative sector address of the start position of the track, "last_rsa" is the relative sector address of the last sector of the track, "last_es_rsa" is a relative sector address of the last entry sector of the track and "track_playing time ( )" is the normal playing time of the track. The relative sector address means the sector address as found with the leading sector of the program set to zero, that is with the leading sector as the starting point. The syntax of "track_playing_time ( )" is as shown in "time ( )", FIG. 8.

The program purpose area of FIG. 15 also includes "entry_points ( )" which identifies the relative sector address of the entry point in the reproducing sequence of the program in each path. 4 bytes are used for each entry point.

"Program_play_times" specify the total reproducing time of the program in a given path and exhibits the syntax shown in FIG. 17. "Program name ( )" has the contents shown by the syntax of FIG. 18. Here, "number_of_languages" is the number of languages in which the program name is represented, "original_language_number" is the language number of the original language of the program, "language_code" is a three-letter character as prescribed in the ISO639-2 standard, "character_set_code" is an identification number of the character set used to represent the disc name, and "program_name_string ( )" is the program name.

Returning to the program TOC information ("program_TOC ( )") shown in FIG. 15, "track_name" represents the name of each track in the program, as shown by the syntax of FIG. 19. The "track_name" syntax includes "number_ of_languages" to specify the number of languages in which the track name is stated, "original_language_number" identifies the language number of the original language of the track, "language_code" is a three-letter character as prescribed in ISO639-2, "character_set_code" is an identification number of the character set used for representing the track name; "track_name_string_offset" is an offset specifying the number of bytes from the start position of the "track_names ()" table up to the first character of "track_name_string ()", wherein the track name is specified.

The program TOC information additionally includes "program_date ()" which represents the disc recording dates by "program_recording_date ()", as shown by the syntax of FIG. 20.

The program TOC information also includes "track_dates" which represent the track recording dates by "track_recording_date()", as shown by the syntax of FIG. 21.

If, in "track_names ()" and "track_dates ()", there exist plural reproducing sequences (paths), only one "track_names ()" and only one "track_dates ()" are used in a program without regard to the different paths that may be used. However, if the track names or the recording dates differ in each pass, a number of "track_names ()" and "track_dates ()" equal to the number of the paths are recorded.

The program TOC information recording area PTOC further includes "program_copyright ()" and "program_publisher ()" which represent information relating to the copyright and the publisher of the respective programs. The specific recording contents may be selected by the copyright owner and the publisher as desired and at their discretion.

If three programs PGM1, PGM2 and PGM3 are recorded in is accordance with the present invention, as shown for example in FIG. 22, the digital moving picture data and the audio data of the respective programs PGM1, PGM2 and PGM3 are divided into packets with each packet being thought of as a unit. Plural entry points at which accessing may begin are set in the bit stream which is then time-division multiplexed in a self-completed fashion. The digital moving picture and audio data packets of one program are recorded as the time division multiplexed bit stream in an area on the recording medium. In "program_linkage ()" shown in FIG. 6, the logical sector address A of the start position of the leading track of each program is the "first_track_lsa", the logical sector address B of the start position of the last track of each program is the "last_track_lsa", the logical sector address C of the last entry sector of the last track of each program is the "last_es_lsa", and the logical sector address D of the end position of the last track of each program is the "last_program_lsa" as shown in FIG. 22. Thus, the position information data A to D are recorded on the disc TOC recording area DTOC.

By recording the start position information A and the end position information D of the programs PGM1, PGM2 and PGM3 as well as the position information A, C of the first and last entry points of each program, the reproducing system with which the disc is used can perform normal reproduction and fast forward reproduction using the position information data A and D as jump points of the respective programs PGM1, PGM2 and PGM3. For example, and as shown in FIG. 22, forward reproduction is started at the logical sector address A at the start position of the leading track of the program PGM1 and continues to the logical sector address D of the end position of the last track of the program PGM1. Then by jumping to the logical sector address A of the start position of the leading track of the program PGM2, which is to be reproduced next, the program PGM2 then may be reproduced in the forward direction until the logical sector address D which is the end position of the last track of the program PGM2. Thereafter, by jumping to the logical sector address A of the start position of the leading track of the program PGM3 which is to be reproduced next, the program PGM3 is reproduced in the forward direction. In this manner, the programs PGM1, PGM2 and PGM3 may be reproduced consecutively. Fast-feed reproduction in the reverse direction may also be performed using the position information data A and C as the jump points of the programs PGM1 to PGM3. That is, reverse reproduction is started at the logical sector address C of the last track of the program PGM3 and continues to the logical sector address A of the leading track of the program PGM3. Then, by jumping to the logical sector address C of the last entry sector of the last track of the program PGM2 which is to be reproduced next, the program PGM2 is reproduced in the reverse direction, up until the logical sector address A at the leading position of the leading track of the program PGM2. Then, by jumping from the logical sector address A of program PGM2 to the logical sector address C of the last entry section of the last track of the program PGM1 which is to be reproduced next, the programs PGM3, PGM2 and PGM1 may be reproduced in the reverse direction.

For forward track search, the leading ends of the tracks of the program PGM1 are sequentially searched for accessing the logical sector address A at the start position of the leading track of the program PGM2. Similarly, the leading ends of the tracks of the program PGM2 are sequentially searched for accessing the logical sector address A at the start position of the leading track of the program PGM3. Hence, the programs PGM1, PGM2 and PGM3 are searched consecutively in the forward direction.

For reverse track search, the leading ends of the tracks of the program PGM3 are sequentially searched in the reverse direction for accessing the logical sector address B which contains the start position of the last track of the program PGM2. Similarly, the leading ends of the track of the program PGM2 are sequentially searched in the reverse direction for accessing the logical sector address B which contains the start position of the last track of the program PGM1; and the tracks of the program PGM1 are sequentially searched in the reverse direction. Thus, the programs PGM1, PGM2 and PGM3 are searched consecutively in the reverse direction.

If a program has plural reproducing sequences (paths), it is advantageous to identify the same positions of the first and last entry sectors and the same position of the last sector in the program for all paths in that program, as shown in FIG. 23. In this case, the programs PGM1 and PGM2 may be consecutively reproduced by path 1 as well as by path 2 simply by recording one set of the three position identifying addresses A, B and C for each program.

By specifying that a given program has only one logical sector address B which contains the start position of the last track of that program without regard to the paths, the programs PGM1, PGM2 and PGM3 may be reproduced consecutively.

Entry point sector identification is particularly useful in accessing entry points of video pictures that are recorded in compressed form in accordance with the MPEG standard. Briefly, in MPEG video, moving pictures are processed as a unit consisting of a group-of-pictures (GOPs). The GOP is made up of a plurality of intra-coded pictures (or I-pictures) and inter-coded pictures (or P- or B-pictures). Since the first picture in each GOP is necessarily an I-picture, only the I-pictures are decoded and reproduced for fast search.

In the MPEG standard, the number of pictures contained in a GOP can be varied. On the other hand, if the number of pictures in the GOP is fixed, the beginning of the GOP becomes random if the moving pictures are recorded at a variable rate on the recording medium. To account for this, an entry packet is provided directly before the packet in which the first I-picture of the GOP is present, and a flag is set in this entry packet to properly identify it. The distance or position with respect to three forward and backward entry points is recorded in this entry packet.

For searching, only the I-pictures are decoded, and I-pictures are recovered, by accessing the next entry point which follows the current entry point and then decoding only the I-pictures therefrom. For fast searching, only every n-th entry point is accessed. Although entry points may be represented by entry packets, entry points can be defined by adding suitable identification codes to the usual data packets. In the present invention, Program System Directory (PSD) and Program Stream Map (PSM), as defined in the MPEG System (ISO(3818-1)), are used, and a sector (entry point) recorded in both the PSD and the PSM is termed an entry sector.

Figure 24:
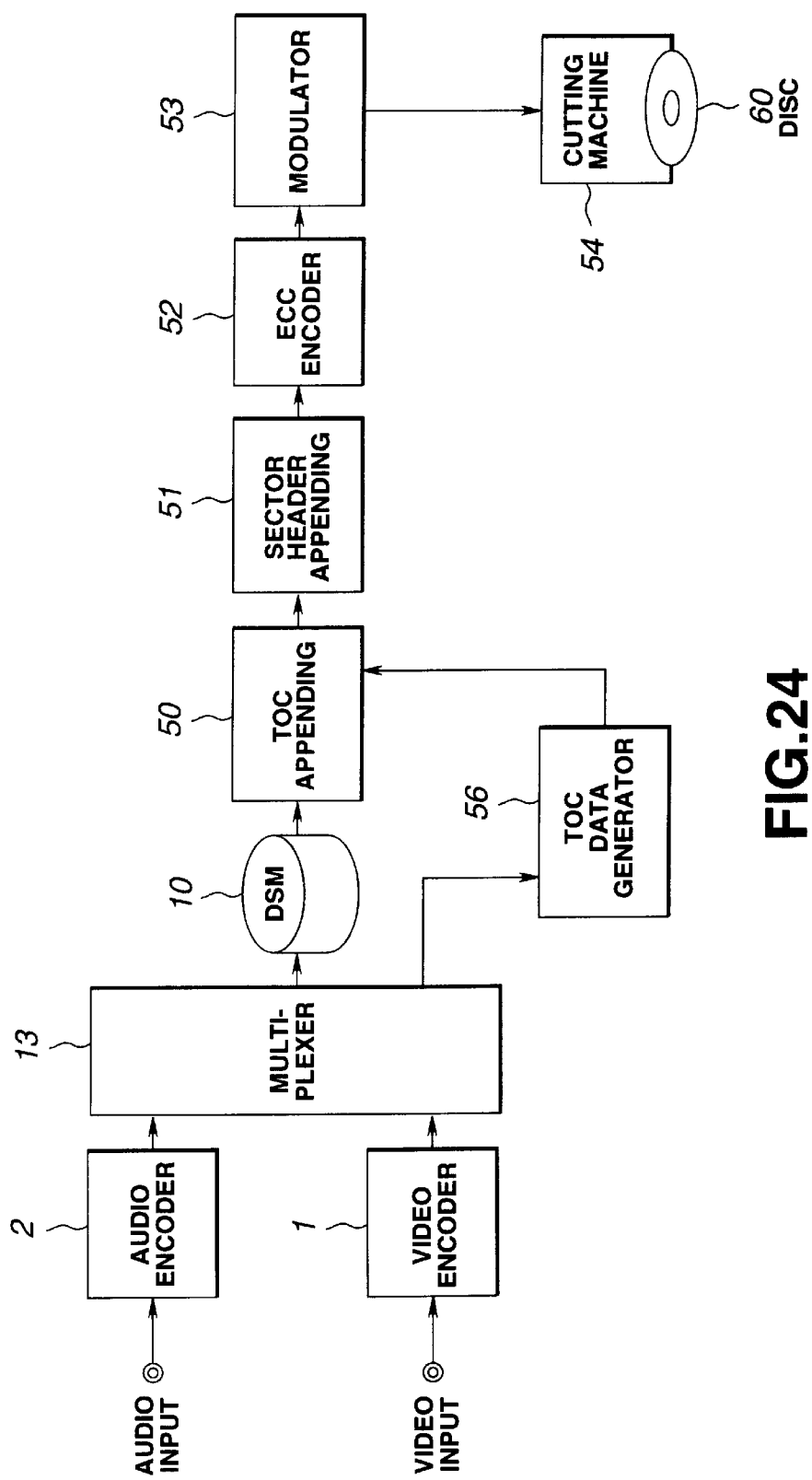
FIG. 24 is a block diagram of data recording apparatus which incorporates the present invention.

Data recording apparatus which incorporates the present invention now will be explained in conjunction with FIG. 24.

Here, video data and speech data are separately packetized and time-division multiplexed for recording by, for example, a cutting machine 54 on a disc 60. Video signals supplied from an external source are encoded by a video encoder 1. similarly, audio signals supplied from an external source are encoded by an audio encoder 2. Outputs of the video encoder 1 and the audio encoder 2 are supplied to a multiplexer 13 whose output terminal is connected to a digital storage medium (DSM) 10 for temporarily storing the encoded video and audio data.

Figure 25:
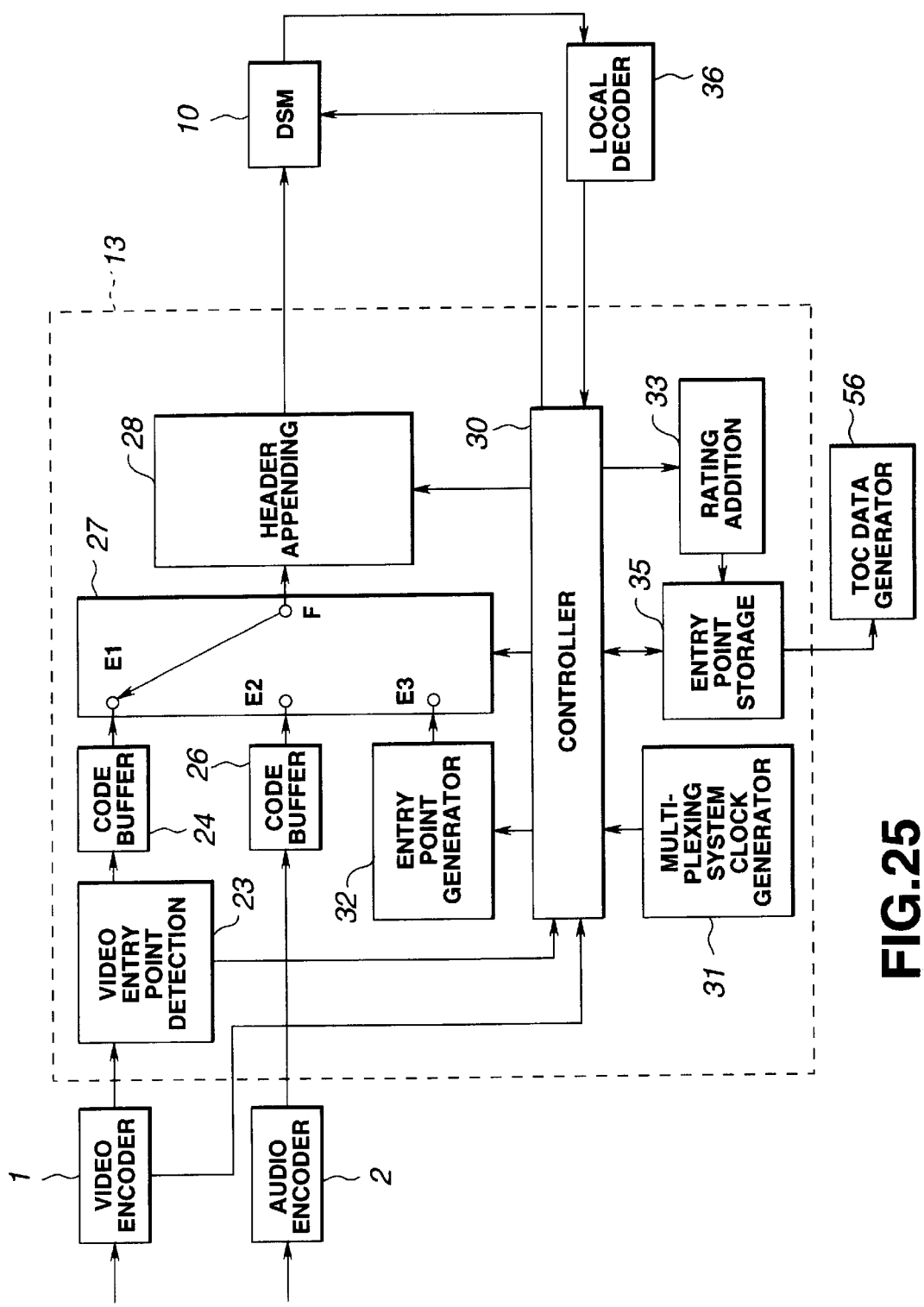
FIG. 25 is a block diagram of a multiplexer of the data recording apparatus which incorporates the present invention.

An output of the DSM 10 is supplied to a table-of-contents (TOC) appending circuit 50 whereby TOC data is appended to the leading portion of the data stream. The TOC appending circuit has its output connected to a sector header appending circuit 51 whose output is, in turn, coupled to an ECC encoder 52 which supplies ECC encoded data to a modulation circuit 53, from which the modulated data is coupled to cutting machine 54 for cutting the optical disc 60. The TOC appending circuit 50 is supplied with TOC data from a TOC generating circuit 56, the TOC data being a function of the output of an entry point storage device 35 provided in multiplexer 13, as shown in FIG. 25.

Compression-encoded video signals are supplied via an entry point detection circuit 23 to a code buffer 24 in multiplexer 13. Compression encoded audio signals are supplied directly to a code buffer 26. Code buffer 24 has its output terminal connected to an input terminal El of switching circuit 27, and code buffer 26 has its output terminal connected to an input terminal E2 of the switching circuit. Switching circuit 27 has its output terminal F connected to an input terminal of a header appending circuit 28, the output of which is coupled to digital storage medium (DSM) 10. The DSM may be a magneto-optical disc, a magnetic disc, or the like.

A controller 30 is responsive to system clock signals supplied by a multiplexing system clock generating circuit 31 to connect output terminal F of switching circuit 27 to input terminals E1 and E2 thereof at pre-set periods and thereby time-division multiplex the video and audio data from the code buffers 24, 26. The resulting multiplexed data is output to the header appending circuit 28. The controller controls the switching circuit and the header appending circuit for generating an MPEG bit stream.

An entry point generating circuit 32 is responsive to a control input from controller 30 to transmit entry point data to an input terminal E3 of switching circuit 27.

The controller controls header appending circuit 28 to append a video packet header to video data read out from the code buffer 24 and to append an audio packet header to audio data read out from the code buffer 26. The controller responds to an entry point generating signal generated at I-picture timing by the video encoder 1, or to the detection of an entry point by entry point detection circuit 23 to control entry point generating circuit 32 to insert the PSD and the PSM into pre-set positions in the video data bit stream, for example, at a position which directly precedes the video entry point. That is, on reception of the entry point generating signal, controller 30 causes the entry point generating circuit to generate the PSD and PSM and causes the switching circuit 27 to connect output terminal F to input terminal E3 for routing the PSD and PSM to header appending circuit 28. As a result, the PSD and PSM are multiplexed with video data and audio data from the code buffers 24, 26.

In the PSD of each entry point, the positions of the third forward, second forward, directly forward, directly backward, second backward and third backward entry points are recorded in three offsets prev_directory and three offsets next_directory offset. The positions of the previous forward entry points, specifically the third forward, second forward and directly forward entry points, may be stored in an entry point storage device 35 so that these entry point positions are known at the time of recording the current entry point positions. These positions may be supplied to the DSM for recording on the disc. However, the positions of the backward or future entry points are not known at the current time points of the program being recorded. Preferably, therefore, the controller causes all of the entry point positions to be stored in entry point storage device 35. After the end of the multiplexing operation, that is after recording the bit stream of the video data and the audio data in their entirety, controller 30 causes the positions of the third forward, second forward, directly forward, directly backward, second backward and third backward entry points to be read out from entry point storage device 35 to DSM 10 for post-reording these entry point positions on the disc.

A rating addition circuit 33 transmits information specifying the reproducing sequence in a particular path of reproducing the entry points and this information is recorded in the PSM. The reproducing sequences of entry points in accordance with the respective paths are programmed in the rating addition circuit 33 by a contents producer, that is by a copyright owner or a publisher, in a manner not shown.

When the inputs to video encoder 1 and audio encoder 2 have ceased, position data are recorded at the entry point positions which have already been recorded on the disc. That is, controller 30 reads out the positions of the entry points from entry point storage device 35 and writes the three forward entry points and the three backward entry points at those entry points in DSM 10. A TOC data generating circuit 56 arranges the entry point data supplied from entry point storage device 35 in the correct order as TOC data. The TOC data identifies entry point positions, each entry point being represented by, for example, a four-byte sector address.

The TOC data, thus prepared by TOC data generating circuit 56, is transmitted to TOC appending circuit 50 (FIG. 24) and outputted to sector header appending circuit 51 to temporally precede the multiplexed data read out from DSM 10. The multiplexed data is read out from DSM 10 via TOC appending circuit 50 to sector header appending circuit 51 temporally after the TOC data.

Valid data in each sector comprises 2048 bytes, and the sector header is formed of 16 bytes. The sector header identifies the number of the sector. The sector header appending circuit divides the input data supplied thereto into units of 2048 bytes and appends a 16-byte sector header to each 2048-byte unit. The sector number is recorded at this time into a predetermined portion of the sector header. The output of sector header appending circuit 51 is supplied to ECC encoder 52 which appends a pre-set amount of error correction codes (parity) to the data supplied thereto and outputs the ECC-encoded data to modulator 53 for recording on optical disc 60.

The recording of TOC data, video data and audio data preferably is carried out as explained. However, if the recording medium on which this data is recorded is accessed by and useable with a computer system, files related to the computer program, such as a computer data file or a file system, may be recorded in addition to the TOC data, video data and audio data. The recording positions of these files may be enumerated at positions ahead of PVD, between PVD and DTOC, between PTOCs, between PTOC and PGM, between PGMs or by positions at the back of the PGM. Since the starting positions of the DTOC, PTOC and PGM are variable, the recording positions may be varied depending on the size of the file of the computer system.

Figure 26:
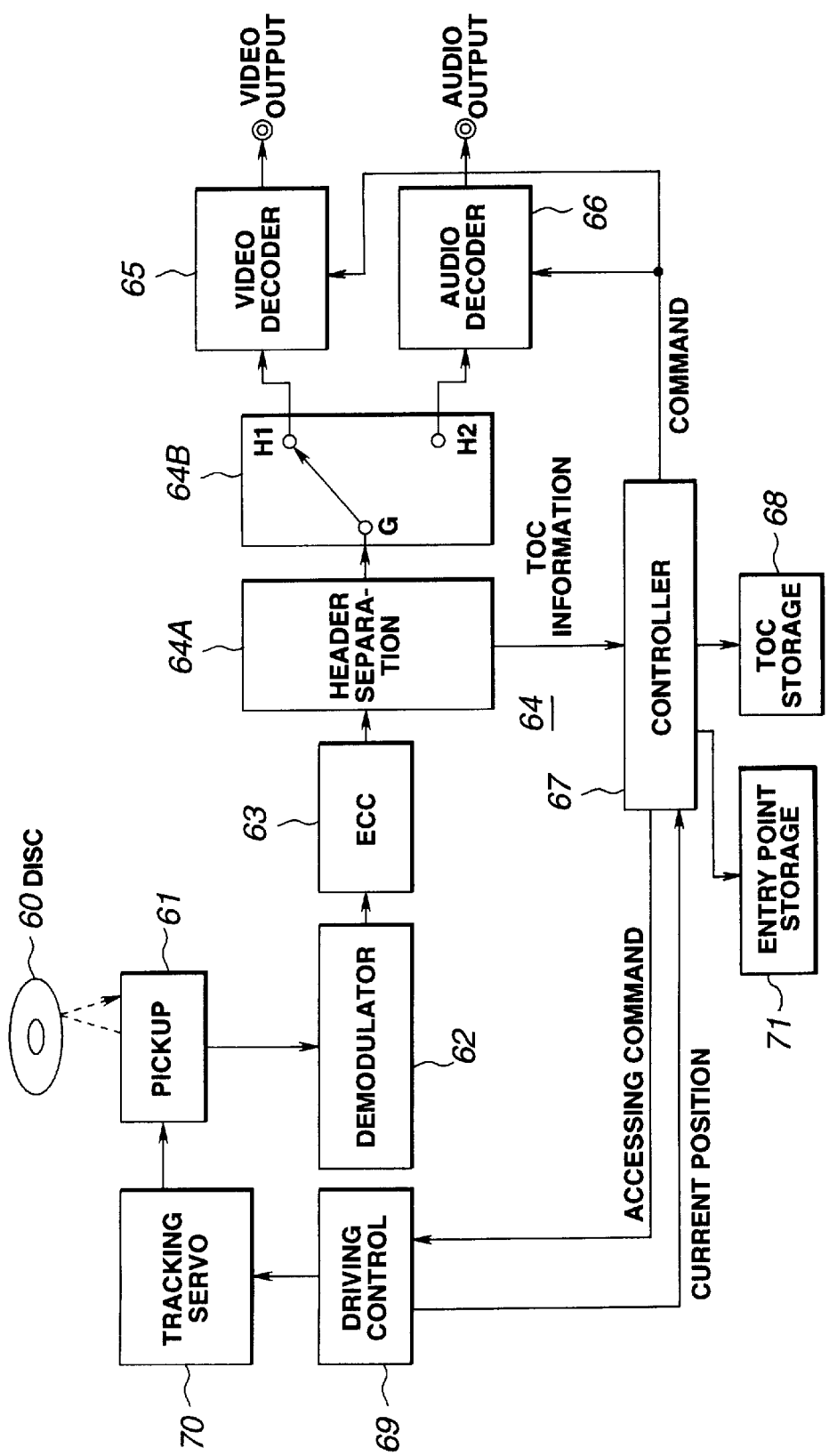
FIG. 26 is a block diagram of data reproducing apparatus which incorporates the present invention.
Figure 27:
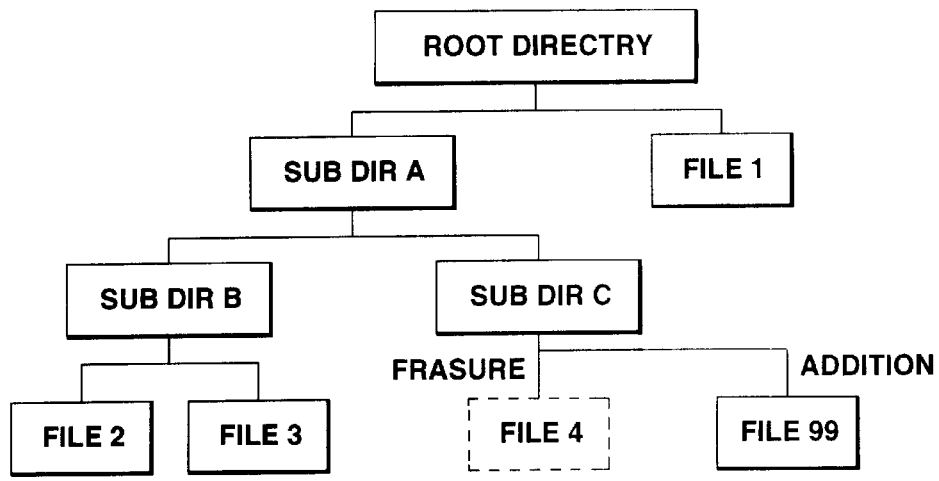
FIG. 27 shows the tree structure of a conventional file system.
Figure 28:
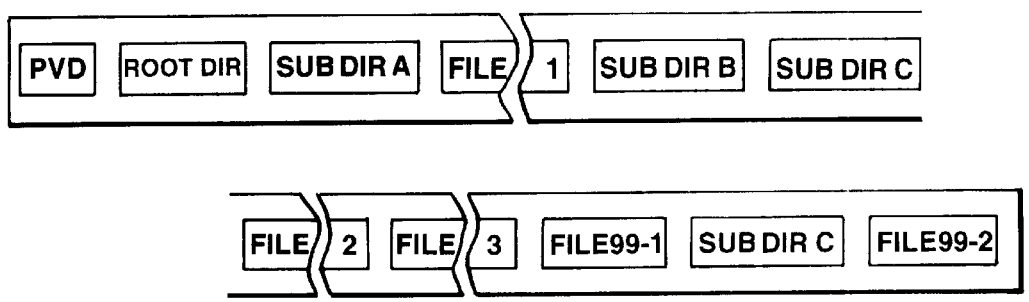
FIG. 28 shows the status of a directory record in which the file position is recorded on a recording medium in the conventional file system.
Figure 29:
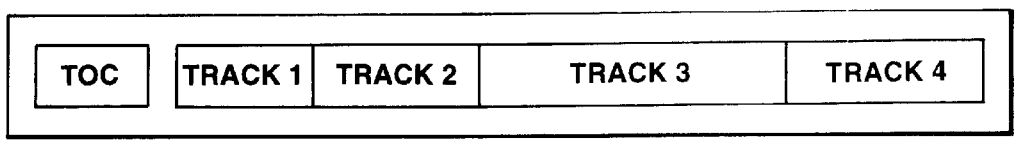
FIG. 29 schematically shows the contents recorded on a conventional CD or video CD.

Data reproducing apparatus which incorporates the present invention now will be explained in conjunction with FIG. 26. When optical disc 60 is inserted in the data reproducing apparatus, a controller 67 issues a command to a driving controller 69 for reading out the leading sector, and controller 69 drives a pickup 61 by a tracking servo control circuit 70 to begin reproduction from the leading sector on the disc.

Pickup 61 projects a laser light beam onto optical disc 60 to reproduce data recorded thereon which is recovered from the reflected beam. The playback signal outputted by the pickup is coupled to a demodulation circuit 62 and the demodulated data string is supplied to an ECC circuit 63 for data error detection and correction. The error-corrected data is applied to a demultiplexer 64 which includes a header separation circuit 64A and a switching circuit 64B.

As discussed above, the leading sector contains the TOC information, which is separated by the header separation circuit 64A and fed to controller 67. The controller 67 causes the TOC information to be stored in a TOC storage device 68 for display to the user via a display unit, not shown.

In response to user commands, controller 67 issues suitable commands to driving controller 69 for initiating playback operations. The driving controller drives pickup 61 via tracking servo circuit 70 to commence reproduction from a position on the disc 60 selected by the user. The controller also issues commands to a video decoder 65 and to an audio decoder 66 for readying the decoding of reproduced data.

Header separation circuit 64A also separates the pack header, packet header, PSD and PSM from the data supplied by ECC circuit 63 and couples the separated data to controller 67. The time-division multiplexed data is supplied through the header separation circuit to the input terminal G of switching circuit 64B. The switching circuit has output terminals H1 and H2 connected to input terminals of video decoder 65 and audio decoder 66, respectively.

Controller 67 senses the entry point information from data supplied thereto by demultiplexer 64 and writes such entry point information into an entry point storage device 71. The controller is supplied with information representing the current readout position by drive controller 69, and hence is capable of storing the positions of the entry points. The controller sequentially couples the input terminal G to the output terminals H1, H2 of switching circuit 64B in accordance with "stream_id" of the packet header supplied from header separator 64A for correctly separating the time-division multiplexed data and thereby supply the video data and the audio data to video decoder 65 and audio decoder 66, respectively.

The manner in which the data reproducing apparatus reproduces the recording medium, having stored therein plural paths, is now explained. Controller 67 monitors the header separator 64A of demultiplexer 64, and if program stream map "Program_stream_map" is detected, the controller checks whether the "Program_stream_map" specifies the reproducing sequence of the entry points in respective paths, and issues an accessing command to drive control circuit 69 to reproduce the recorded programs in the specified reproducing sequence. Sequential reproduction (i.e. consecutive reproduction) of programs, continuous fast forward reproduction (FF) of programs, consecutive forward reproduction (FR) of programs and consecutive forward and reverse track search of programs, are carried out as explained above in conjunction with FIG. 22. That is, controller 67 senses from "Disc_toc ()" stored in TOC storage device 68, the first entry point position, the last sector position the last entry point position and the last track position of each program stored in "program_linkage ()", and compares this position information to the current position information supplied from drive control circuit 69 to detect when the boundary of each program is reached. The controller senses the position of the first entry point of each program to be accessed and issues respective accessing commands to the driving control circuit to access the first entry point position, the last sector position, the last entry point position and the last track position of each program to be accessed next in each reproducing mode. Thus, sequential reproduction (consecutive reproduction), also known as normal reproduction between programs, continuous fast forward reproduction (FF) of programs, consecutive forward reproduction (FR) of programs and consecutive forward and reverse track search of programs may be carried out as desired by the user.

Since normal reproduction, special reproduction (FF, FR) and track accessing may be carried out as described above, the reproducing apparatus shown in FIG. 26 is able to skip files otherwise needed to constitute a computer program file, computer data file or a file system in order to gain access to the picture and video data (program) and even though such files are recorded between PVD, DTOC, each PTOC and each PGM and before and after PVD, DTOC, each PTOC and each PGM, thereby expediting the accessing operation. Therefore, consecutive reproduction operations may be effected without the user becoming conscious of the program-to-program boundary. Also, program accessing may be expedited since the files of the computer system may be arranged at optimum positions on the recording medium.

Although it has been stated above that the files of the computer system may be freely positioned between, before or after each PVD, DTOC, each PTOC and each PGM, this may not be necessary. That is, sufficiently expedited accessing from the computer system is expected if the files simply are allocated between or before or after each PVD, each DTOC and each PTOC, so long as data other than video and audio data (program) are not disposed between the respective PGMS. This reduces the jump distance between programs employing "program_linkage ()", that is jumps can be completed in a shorter time.

In the present embodiment, information concerning each program, for example, each track start position or each entry point position in the program, is recorded as a relative sector address from the leading end of the program. By using such relative sector addresses rather than absolute addresses, the information concerning each program is recorded as self-complete data. Consequently, read out of each program may be attained at high speed when the recorded programs are read by a computer system or by a relatively inexpensive dedicated reproducing device (e.g. a CD or video CD player). The absolute track number unique for the disc is recorded only in Disc_toco, while the track numbers recorded in Program_toc() are relative track numbers which begin at the first program start position. The linking information between programs is recorded in Disc_toc() without being placed in the program or in Program_toc(). By designing the program and Program_toc() in a self-complete manner, that is, by avoiding dependency on the absolute position on the recording medium and by providing a structure not affected by the presence, position or attributes of other programs on the recording medium, program-based re-utilization, program-based addition or deletion and an inter-program reproducing sequence can be performed easily.

For example, data previously prepared as a program may be copied on a new recording medium in an arbitrary sequence in conformity to the purpose of using or playing that program, and only Disc toc () and program_start_lsa field of each program_toc need be newly prepared for completing the new recording medium. In addition, the program reproducing sequence may be modified simply by changing program_linkage () or disc_tracks () of Disc toc () of a previously formed recording medium without modifying the program or Program_toc.

What is claimed is:

1. A method of recording one or more programs formed of moving picture data and audio data presented as a time division multiplexed bit stream, comprising the steps of dividing said picture data and said audio data into packets; defining a plurality of start access entry points for the bit stream representing start entry points of said programs at which said programs arc accessible, each being recorded in a respective area containing plural tracks; and recording program linkage information data representing linkage information between said programs and including information pertaining to the start of the first track of a respective program, information pertaining to the start of the last track of the respective program, and information pertaining to the end position of the last track of the respective program in a predetermined area on a recording medium, said program information data being recorded in a self-complete manner.

2. The method of claim 1, wherein said program information data includes data representative of a starting time of each program.

3. The method of claim 1, wherein said self-complete manner involves recording the information data of a program in a manner relative to said program.

4. The method of claim 1, wherein said self-complete manner includes recording the linking information data between a number of said programs in an area outside the number of said programs.

5. Apparatus for recording a time-division multiplexed bit stream of moving picture data and audio data arranged as one or more programs comprising:

means for dividing the moving picture data into picture packets and for dividing the audio data into audio packets;

entry point generating means for generation plural start access entry point data for the bit stream representing start entry points of said programs at which said programs are accessible each being recorded in a respective area containing plural tracks;

recording means for recording program linkage information data representing linkage information between said programs and including information pertaining to the start of the first track of a respective program, information pertaining to the start of the last track of the respective program, and information pertaining to the end position of the last track of the respective program in a predetermined area on a recording medium, said program information data being recorded in a self-complete manner; and means for recording said start access entry point data in said recording medium.

6. The apparatus of claim 5, wherein said program linkage information includes a start time for said each program; and wherein said recording means is operable to record a start time code for said each program in said respective, dedicated location on said recording medium.

7. The apparatus of claim 5, wherein said self-complete manner involves recording the information data of a program in a manner relative to said program.

8. The apparatus of claim 5, wherein said self-complete manner includes recording the linking information data between a number of said programs in an area outside the number of said programs.

9. A data recording medium having recorded thereon one or more programs of moving picture data and audio data in the form of a time division multiplexed bit stream, with said bit stream being divided into moving picture packets and audio packets; said data recording medium further having recorded thereon data representing a plurality of start access entry points of said programs at which each program is accessible, each being recorded in a respective area containing plural tracks, and program linkage information data representing linkage information between said programs and including information pertaining to the start of the first track of a respective program, information pertaining to the start of the last track of the respective program, and information pertaining to the end position of the last track of the respective program in a predetermined area of said data recording medium, said program information data being recorded therein in a self-complete manner.

10. The medium of claim 9 further including a start time code of each recorded program in a respective dedicated location on the recording medium.

11. The medium of claim 9, wherein said self-complete manner involves recording the information data of a program in a manner relative to said program.

12. The medium of claim 9, wherein said self-complete manner includes recording the linking information data between a number of said programs in an area outside the number of said programs.

13. A method of reproducing one or more programs from a recording medium, wherein each program includes moving picture data and audio data recorded as a time division multiplexed bit stream, said bit stream being divided into moving picture packets and audio packets, and wherein the recording medium has recorded thereon data representing access points of said programs, each being recorded in a respective area containing plural tracks, and program linkage information data representing linkage information between said programs and including information pertaining to the start of the first track of a respective program, information pertaining to the start of the last track of the respective program, and information pertaining to the end position of the last track of the respective program in a predetermined area on said recording medium, said program linkage information data being recorded therein in a self-complete manner, said method comprising the steps of generating an access command for accessing a number of said programs or portions thereof; reading the time division multiplexed bit stream or streams on the recording medium determined by said access command; separating the moving picture packets and the audio packets from the read bit stream or streams; and decoding said moving picture data and said audio data from the separated moving picture and audio packets, respectively.

14. The method of claim 12, wherein said recording medium includes at least one area thereon on which is recorded a start time code of a respective program; and further comprising the steps of reading a start time code from said area and reproducing a program corresponding to the read start time code.

15. The method of claim 12, wherein the step of reading the time division multiplexed bit stream from an access point comprises reading the information from said predetermined area and reproducing a program recorded between said first and last tracks.

16. The method of claim 13, wherein said self-complete manner involves recording the information data of a program in a manner relative to said program.

17. The method of claim 13, wherein said self-complete manner includes recording the linking information data between a number of said programs in an area outside the number of said programs.

18. Apparatus for reproducing one or more programs from a recording medium, wherein each program includes moving picture data and audio data recorded as a time division multiplexed bit stream, said bit stream being divided into moving picture packets and audio packets, and wherein the recording medium has recorded thereon data representing access points of said program, each being recorded in a respective area containing plural tracks, and program linkage information data representing linkage information between said programs and including information pertaining to the start of the first track of a respective program, information pertaining to the start of the last track of the respective program, and information pertaining to the end position of the last track of the respective program in a predetermined area on the recording medium, said program information data being recorded therein in a self-complete manner, said apparatus comprising:

access command generating means for generating an access command to access a number of said programs or portions thereof;

read-out means for reading the time division multiplexed bit stream or streams on the recording medium determined by said access command;

separating means for separating the moving picture packets and the audio packets from the read-out bit stream or streams; and decoding means for decoding said moving picture data and said audio data from the separated moving picture and audio packets, respectively.

19. The apparatus method of claim 16, wherein said recording medium includes at least one area thereon on which is recorded a start time code of a respective program; and wherein said read-out means is operable to read a start time code from said area and reproduce a program corresponding to the read-out start time code.

20. The apparatus of claim 18, wherein said read-out means is operable to read the information from said predetermined area to reproduce a program recorded between said first and last tracks.

21. The apparatus of claim 18, wherein said self-complete manner involves recording the information data of a program in a manner relative to said program.

22. The apparatus of claim 18, wherein said self-complete manner includes recording the linking information data between a number of said programs in an area outside the number of said programs.

* * * * *